United States Patent [19]
Yasaka

[11] Patent Number: 5,163,641
[45] Date of Patent: Nov. 17, 1992

[54] METHOD AND APPARATUS FOR CHANGING ORBIT OF ARTIFICIAL SATELLITE

[75] Inventor: Tetsuo Yasaka, Zushi, Japan

[73] Assignee: Nippon Telegraph and Telephone Corporation, Tokyo, Japan

[21] Appl. No.: 477,876

[22] PCT Filed: Aug. 11, 1989

[86] PCT No.: PCT/JP89/00819
§ 371 Date: Apr. 9, 1990
§ 102(e) Date: Apr. 9, 1990

[87] PCT Pub. No.: WO90/01447
PCT Pub. Date: Feb. 22, 1990

[30] Foreign Application Priority Data

Aug. 12, 1988 [JP] Japan ................ 63-201277
Sep. 16, 1988 [JP] Japan ................ 63-232087

[51] Int. Cl.$^5$ .......................... B64G 1/24; B64G 1/34
[52] U.S. Cl. .................................. 244/164; 244/167
[58] Field of Search ............... 244/158 R, 164, 169, 244/172, 161, 167; 364/434

[56] References Cited

U.S. PATENT DOCUMENTS

| 3,380,687 | 4/1968 | Wrench et al. ............ 244/158 R |
| 3,532,298 | 10/1970 | Swet ........................ 244/167 |
| 3,652,042 | 3/1972 | Welther .................... 244/158 R |
| 4,083,520 | 4/1978 | Rupp et al. ............... 244/161 |
| 4,097,010 | 6/1978 | Colombo et al. ........... 244/158 |
| 4,618,112 | 10/1986 | Keigler .................... 244/158 R |
| 4,635,885 | 1/1987 | Hujsak .................... 244/169 |
| 4,657,210 | 4/1987 | Hubert et al. ............ 244/158 R |
| 4,664,343 | 5/1987 | Lofts et al. .............. 244/158 r |
| 4,750,692 | 6/1988 | Howard .................... 244/158 R |
| 4,834,325 | 5/1989 | Faget et al. .............. 244/158 R |

FOREIGN PATENT DOCUMENTS 0196793 10/1986 European Pat. Off. .
52-39300 3/1977 Japan .
61-268599 11/1986 Japan .

OTHER PUBLICATIONS

Tethers In Space Handbook—Second Edition-pp. 156-161 National Aeronautics and Space Administration-May 1989.
Space Tethers for Science in the Space Station Era-vol. 14, pp. 576-580.

Primary Examiner—Joseph F. Peters, Jr.
Assistant Examiner—Virna Lissi Mojica
Attorney, Agent, or Firm—Frishauf, Holtz, Goodman & Woodward

[57] ABSTRACT

A method and apparatus for changing the orbit of an artificial satellite. The apparatus is caused to approach a target satellite and to be coupled thereto in space so as to constitute a dumbbell-like coupled system. The apparatus has a propulsion unit. The unit generates a thrust, whereby the velocity of the center of gravity of the apparatus increases, and the apparatus rotates around the center of gravity. As a result, the coupling system is placed in transition orbit.

In the transition orbit, the coupled system is released at a timing when the direction of elongation of the coupled system becomes perpendicular to the orbital velocity vector. Subsequently, the target satellite is placed in a final target orbit, and the separated orbit changing apparatus is placed in an orbit different from the target orbit.

9 Claims, 13 Drawing Sheets

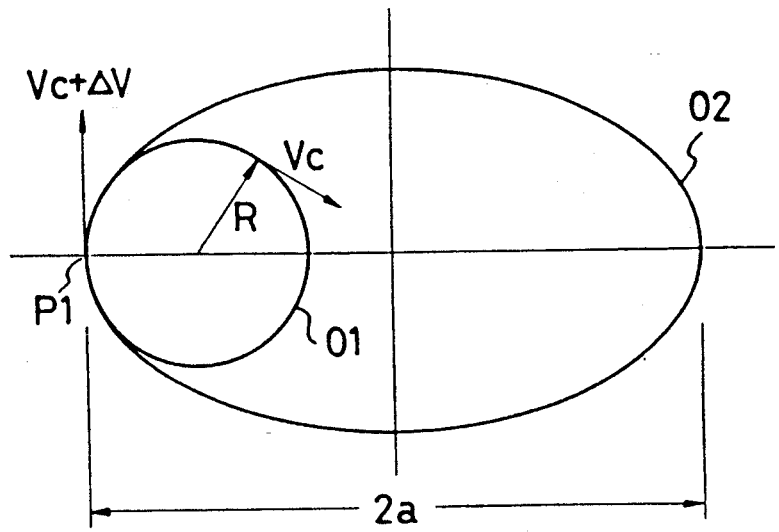
F I G. 1
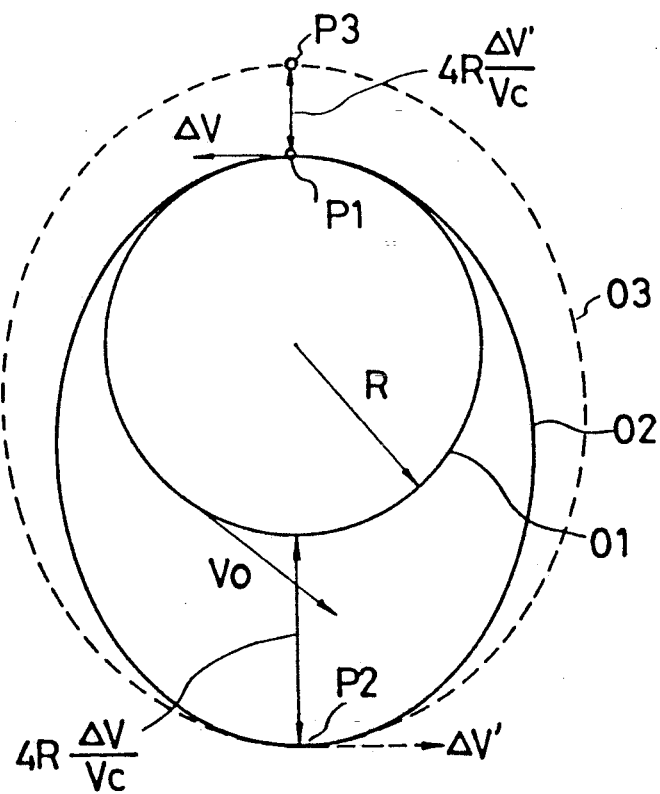
F I G. 2

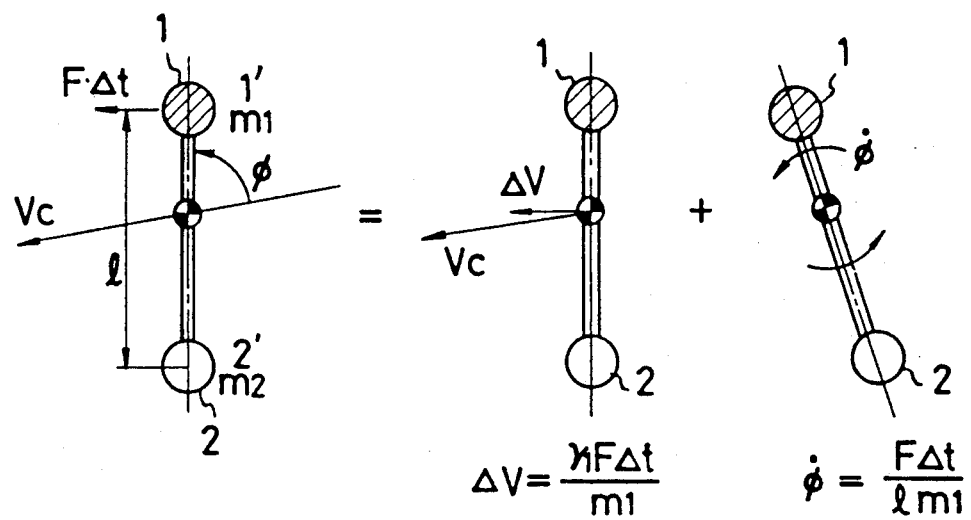
F I G. 4
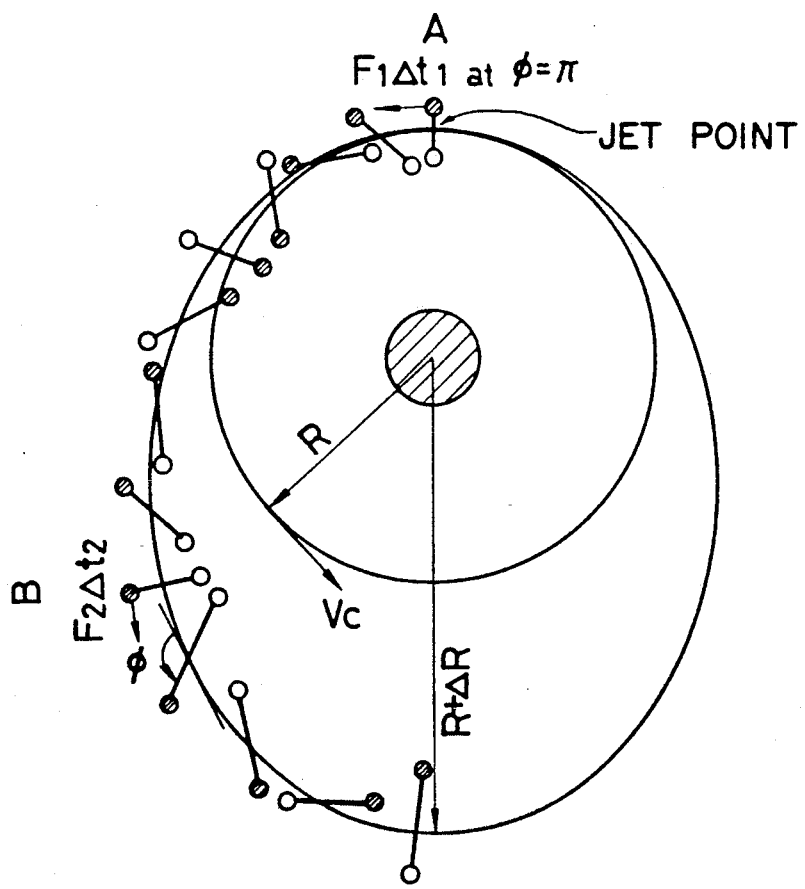
F I G. 5

F I G. 7A
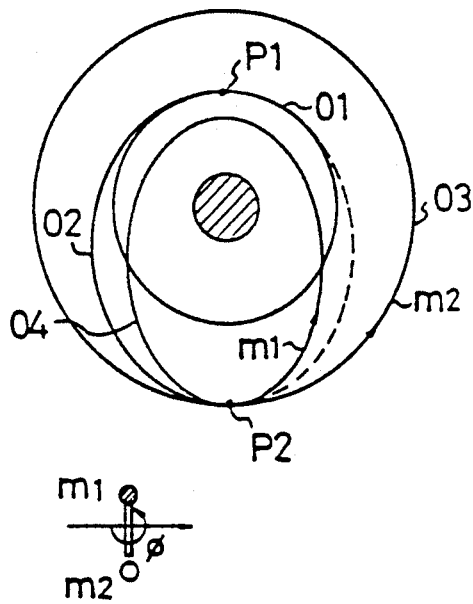
F I G. 7A(1)
APOGEE
($\phi = 3\pi/2$)
PERIGEE
($\phi = 3\pi/2$)
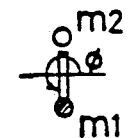
F I G. 7B(1)
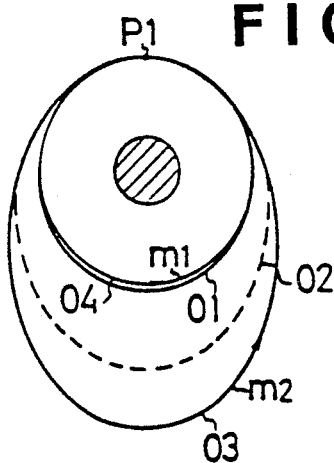
F I G. 7B

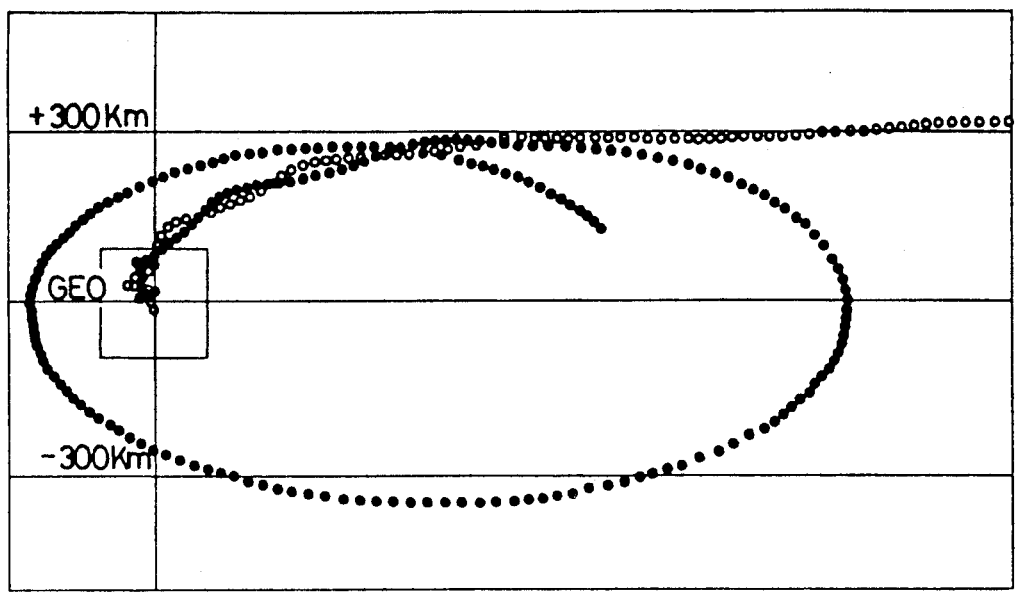
PLOT INTERVAL 10min
F I G. 8A  $\gamma_1 = 0.5$  APOGEE (AFTER 12 HOURS)
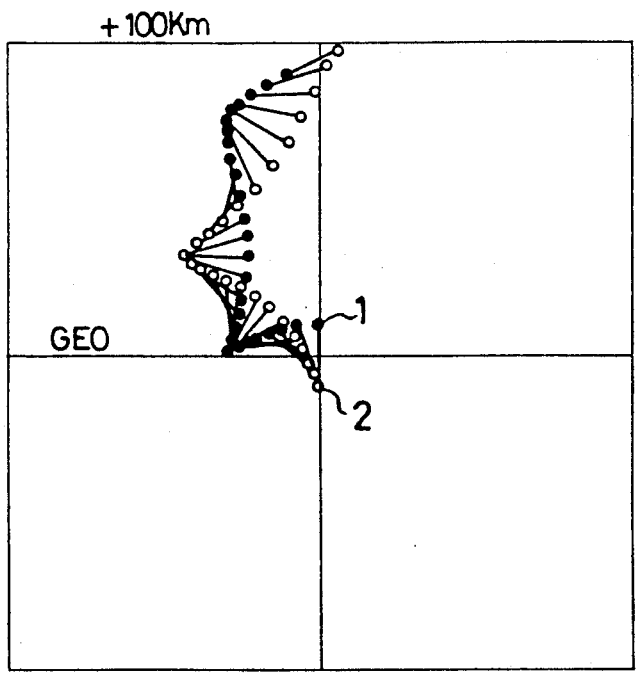
F I G. 8B

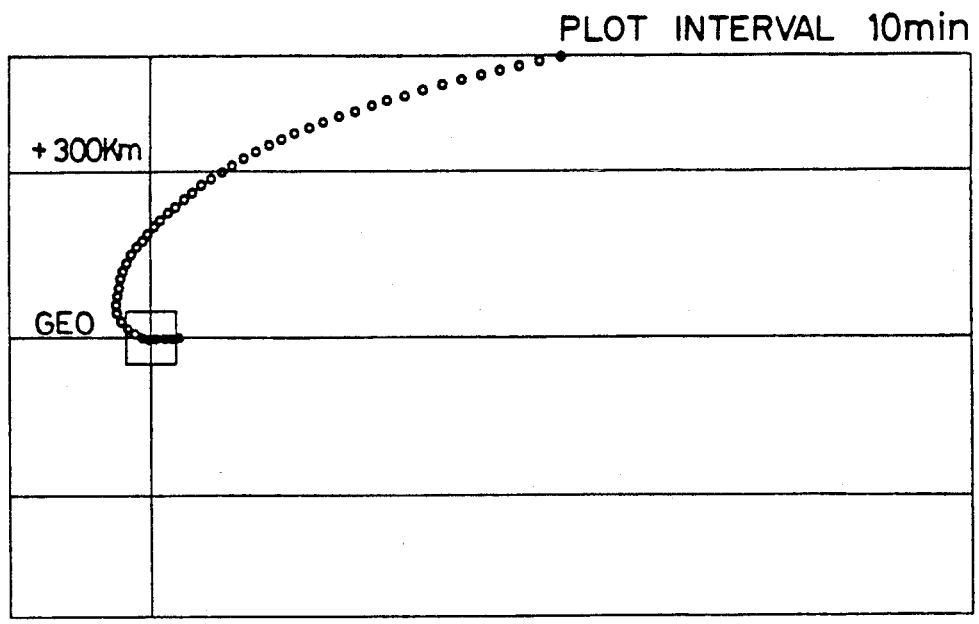
F I G. 9A  $\gamma_1 = 0.5$ PERIGEE (AFTER HALF ROTATION)
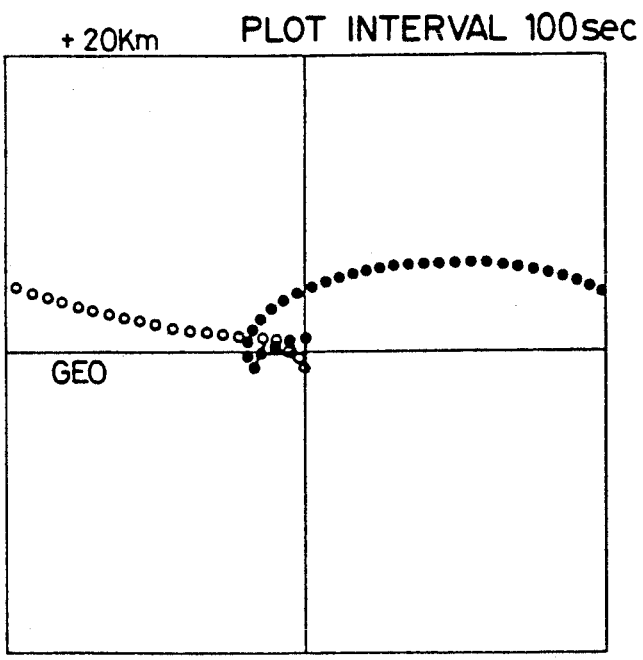
F I G. 9B

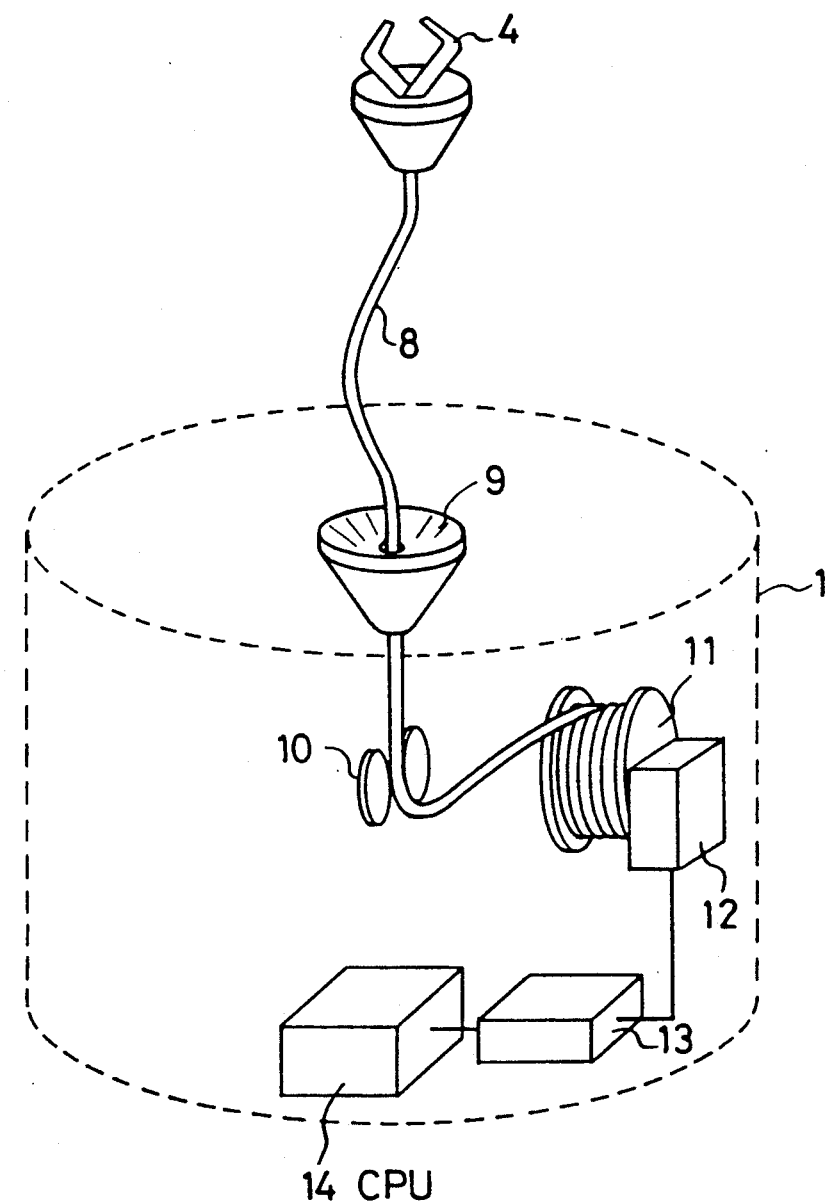
F I G. 12

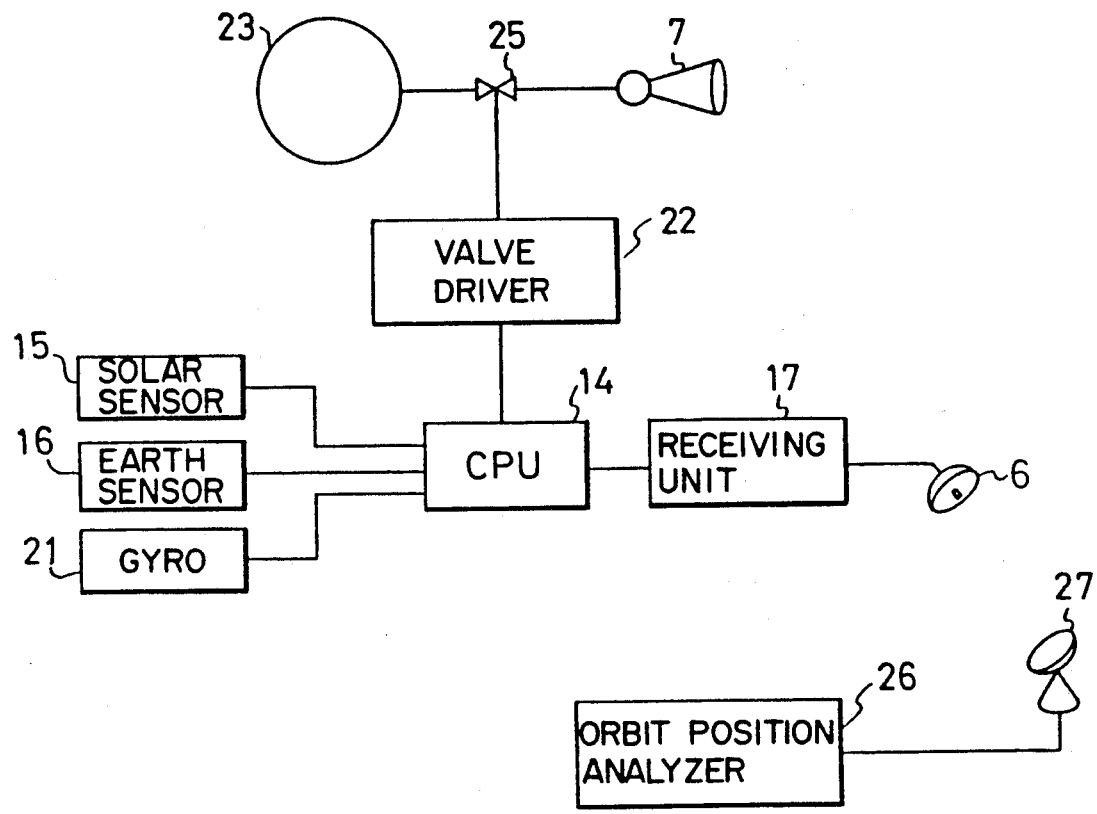
F I G. 14

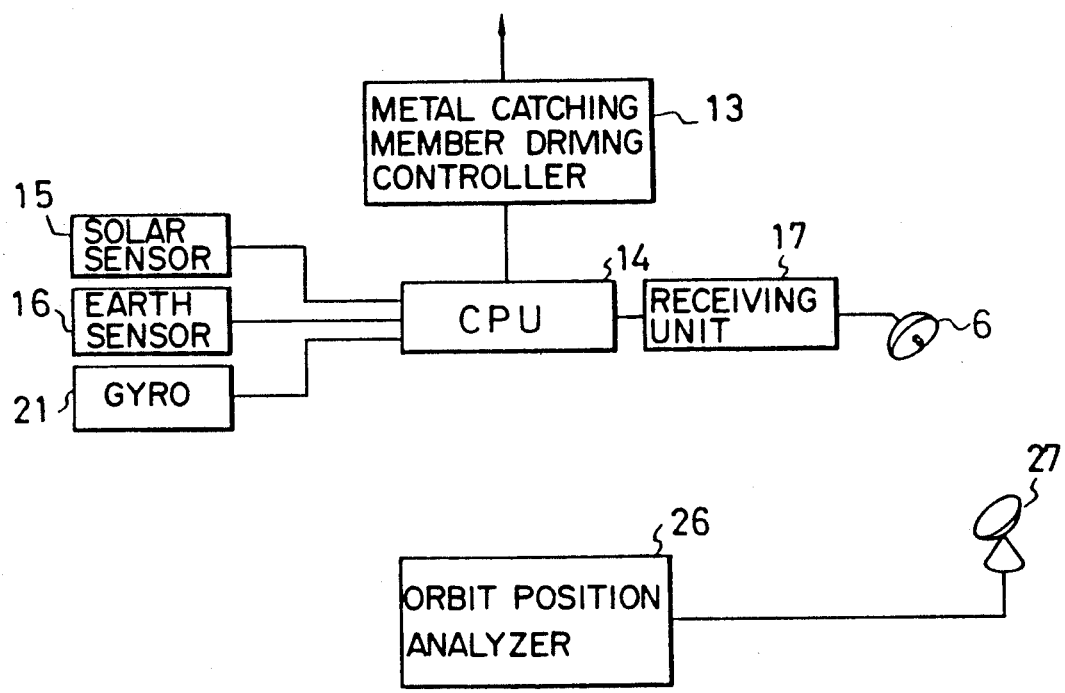
F I G. 15

METHOD AND APPARATUS FOR CHANGING ORBIT OF ARTIFICIAL SATELLITE

TECHNICAL FIELD

The present invention relates to a method and apparatus for changing the orbit of an artificial satellite by causing an orbit changing apparatus to approach a target satellite and to be coupled thereto in space so as to form a coupled system, changing the orbit of the coupled system by a thrust, and releasing the coupling of the target satellite with the orbit changing apparatus at a predetermined timing so as to set the target satellite in a final orbit and to set the orbit changing apparatus in an orbit which is convenient for reuse and is different from the final orbit.

BACKGROUND ART

The orbits of artificial satellites are determined in accordance with application purposes. A so-called stationary orbit satellite such as a communication satellite or a meteorological satellite must be held in a predetermined orbit until the end of its service life. Therefore, if the service life of a stationary orbit satellite comes to an end or the satellite fails, a new satellite cannot be placed in the predetermined orbit unless the old satellite is removed from the predetermined orbit and discarded.

An orbit correcting apparatus approaches the target satellite to be discarded and is coupled thereto. Subsequently, the coupled system is caused to leave the predetermined orbit by the thrust of the orbit correcting apparatus.

In a conventional method of changing the orbit of an artificial satellite by using such an orbit correcting apparatus, as shown in FIG. 1, for example, the orbit correcting apparatus, which is rotated in an original orbit O1 having an orbital radius R at a peripheral velocity $V_c$ in advance, catches and is coupled to a target satellite at a point P1. The orbit correcting apparatus then generates a thrust to allow a coupled system constituted by the orbit correcting apparatus and the target satellite to obtain a velocity increase $\Delta V$. When the velocity increase $\Delta V$ is represented by the following equation:

$$(V_c + \Delta V^2) = \mu(2/R - 1/a) \tag{1}$$

where $\mu$ is a gravity coefficient which is 638,603 km3/s$^2$ for the earth, the coupled system constituted by the orbit correcting apparatus and the target satellite is placed in an elliptic orbit O2 as a transition orbit having a semi-major axis a. The target satellite is separated from the correcting apparatus in the elliptic orbit O2, and is placed in a new orbit.

FIG. 2 is a view for explaining an orbit changing operation in more detail. An apogee P2 of the transition orbit O2 is higher than the original orbit O1 by approximately $$4R \frac{\Delta V}{V_c}$$

When the orbit correcting apparatus is to be reused, the apparatus must return to the original orbit O1 by generating a thrust at the point P1 on the orbit O2, at which the orbit O2 is in contact with the original orbit O1, in the opposite direction in the same manner as in the case wherein the velocity increase $\Delta V$ is obtained.

In order to prevent the orbit correcting apparatus from crossing the original orbit, the correcting apparatus is caused to generate a thrust to obtain a velocity increase $\Delta V'$ at the apogee P2, and the coupled system is placed in an orbit O3, as shown in, e.g., FIG. 2. The target satellite is rotated in the orbit O3, and passes through a perigee P3 which is separated from the perigee P1. That is, the target satellite acquires the new orbit O3 which does not cross the original orbit.

When the conventional orbit correcting apparatus is to be reused, the coupling of the correcting apparatus with the target satellite is released at, e.g., the point P2. The orbit correcting apparatus then generates a thrust in the opposite direction to return to the orbit O2, and generates a thrust again at the point P1 to return to the orbit O1. The orbit correcting apparatus is thus rotated and reused in the orbit O1.

As described above, when the conventional orbit correcting apparatus is to be reused, the apparatus must leave an original orbit to discard a target satellite in a new orbit and return to the original orbit by using a thrust force in the opposite direction. At this time, since a velocity increase required for the orbit correction is substantially the same as that used to obtain the new orbit, a large amount of thrust energy is required. For this reason, the orbit correcting apparatus is discarded together with the target satellite and is not reused in spite of the fact that reuse of the apparatus is desired.

In addition, even if the orbit correcting apparatus needs to be discarded together with the target satellite, it need not be moved to the same orbit as that of the target satellite. In practice, however, they must be temporarily moved together to the same orbit. This is wasteful in terms of energy.

DISCLOSURE OF INVENTION

The present invention has been made in consideration of the above situation, and has as its object to provide a method and apparatus for changing the orbit of an artificial satellite, in which after an orbit correcting apparatus catches a target satellite in space, the target satellite can be separated from the apparatus so as to be set in a new orbit and the apparatus can be returned to an original orbit, with a small consumption amount of energy, so as to be reused.

According to a method of changing an orbit of an artificial satellite of the present invention, an orbit changing apparatus is caused to approach a target satellite in an orbit around the earth, a catching member mounted on the orbit changing apparatus and arranged on the distal end of an elongated coupling member is caused to catch the target satellite so as to constitute an elongated coupled system, and a thrust is generated at least once in a direction perpendicular to a direction of elongation of the coupling system so as to simultaneously generate a rotational motion around the center of gravity of the coupled system and a new translational moving member of the center of gravity, thereby moving the coupled system to a transition orbit. In the transition orbit, the coupled system is released at a timing when the direction of elongation of the coupled system becomes perpendicular to the orbital velocity vector. Subsequently, the target satellite is discarded into a final target orbit. The orbit changing apparatus can be returned to substantially an original orbit at a small energy consumption amount in order to allow reuse of the apparatus.

In addition, the apparatus for changing the orbit of an artificial satellite includes an elongated coupling member having one end mounted on the apparatus main body, having the other end on which a catching member for catching the target satellite is arranged, and the coupled system is formed by coupling the target satellite to the orbit changing apparatus through the elongated coupling member. The apparatus main body includes a sensor, combined with orbit data transmitted from the earth, for detecting an orbital velocity vector and an attitude of said orbit changing apparatus. The main body is assumed to have a means for changing/controlling the orbit of the main body, and means for changing the attitude of the main body which are generally included as part of the main body in most satellites.

A propulsion unit for generating a thrust in a direction perpendicular to the direction of elongation of the coupled system is arranged in the main body. The propulsion unit comprises a driving control means for driving the propulsion unit in synchronism with a timing when the axis of the thrust becomes parallel to the orbital velocity vector, and a catching member driving control means for releasing the coupled system at a timing when the direction of elongation of the coupled system becomes perpendicular to the orbital velocity vector, placing the target satellite in a final target orbit, and returning the separated orbit changing apparatus to substantially the original orbit so as to allow reuse of the apparatus.

BRIEF DESCRIPTION OF DRAWINGS

FIG. 1 is a view showing a relationship between an original orbit around the earth and a transition orbit obtained by changing the original orbit;

FIG. 2 is a view for explaining an orbit changing operation in FIG. 1 in more detail;

FIG. 4 is a view showing a case wherein when a thrust is applied to the orbit changing apparatus, at the center of gravity of an elongated coupled system constituted by the orbit changing apparatus and the target satellite, a translational velocity $\Delta V$ and a rotational velocity $\phi$ around the center of gravity at obtained;

FIG. 5 is a view showing an embodiment in which a thrust is intermittently applied to the orbit changing apparatus in a transition orbit;

FIGS. 7A, 7A(1), 7B and 7B(1) are views showing a separating operation of the target satellite at an apogee and a perigee, and the orbits of the orbit changing apparatus and the target satellite after the operation;

FIGS. 8A and 8B are a view and an enlarged view of a result obtained by computer simulation of the orbit change at the a apogee;

FIGS. 9A and 9B are a view and an enlarged view of a result obtained by computer simulation of the orbit change at the perigee.

FIG. 12 is a perspective view showing a schematic arrangement of a driving system for driving a cable used as a coupling member 3;

FIG. 14 is a block diagram for explaining an operation of a propulsion unit in FIG. 13; and FIG. 15 is a block diagram for explaining an operation when the target satellite is separated from the orbit changing apparatus of the present invention.

BEST MODE OF CARRYING OUT THE INVENTION

An embodiment of the present invention will be described below with reference to the accompanying drawings.

Figure 3:
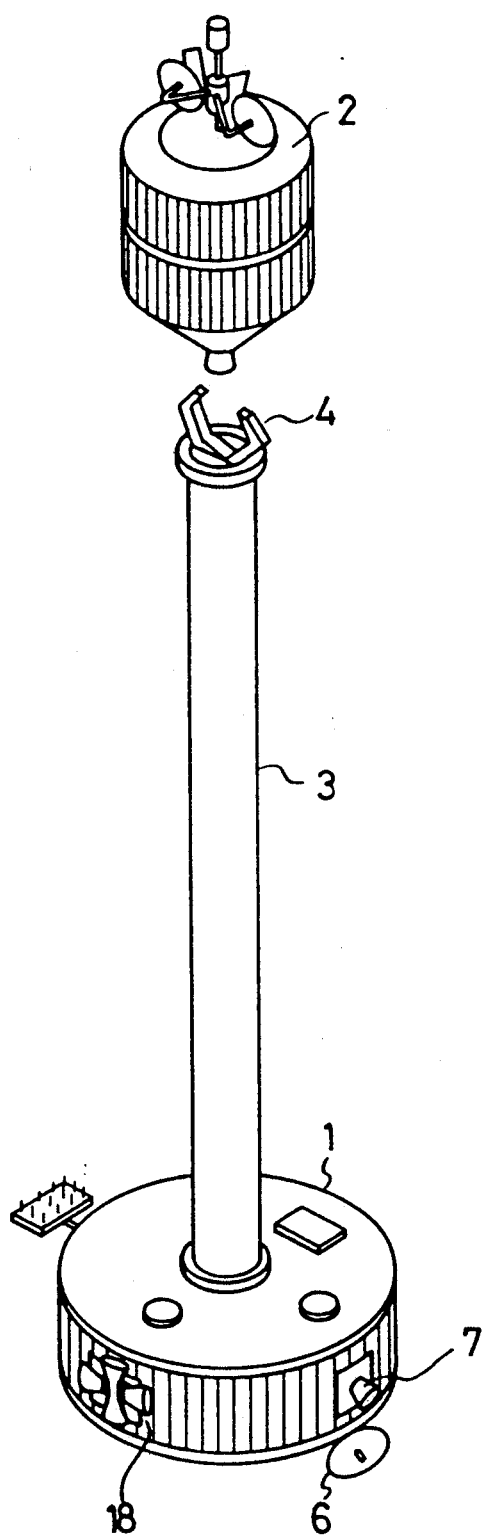
FIG. 3 is a schematic perspective view showing a state wherein an orbit changing apparatus of the present invention catches a target satellite.

FIG. 3 is a perspective view showing a state wherein an orbit changing apparatus of the present invention tries to catch a target satellite 2. One end of the elongated coupling member 3 in the shape of a boom is fixed to the orbit changing apparatus 1. A metal catching member 4 is mounted on the other end of the coupling member 3. The metal catching member 4 catches the target satellite 2 under the control of a controller (not shown in FIG. 3) for controlling a catching operation of the member 4. An orbit control propulsion unit 18 and an antenna 6 for receiving orbit data from the earth are mounted on the outer surface of the orbit changing apparatus 1.

The orbit changing apparatus 1 is coupled to the target satellite 2 through the coupling member 3 so as to constitute a dumbbell-like coupled system.

When a thrust is applied to the center of gravity of the orbit changing apparatus 1 as one of the masses of the dumbbell in a direction perpendicular to the direction in which coupling member 3 is elongated, a translational velocity increase and a rotational motion around the center of gravity of the coupled system are induced in its orbit. The coupled system is placed in a transition orbit due to the translational velocity increase. With regard to one of the mass points of the dumbbell, an angular momentum relative to the center of the earth is periodically changed. Since the angular momentum of the overall coupled system is constant, this momentum is periodically converted between the mass points of the dumbbell. When catching of the metal catching member 4 is released at a predetermined timing upon conversion of the angular momentum, the target satellite 2 is moved to a target orbit.

FIG. 4 shows a case wherein when a thrust is applied to the orbit changing apparatus 1 while the coupled system is moving at an original orbital velocity $V_c$, a velocity $\Delta V$ in a direction perpendicular to the direction of elongation of the coupled system and a rotational velocity $\phi$ around the center of gravity are obtained at the center of gravity of the coupled system. Referring to FIG. 4, the orbit changing apparatus is represented by a mass point 1' having a mass m1, and the target satellite 2 is represented by a mass point 2' having a mass m2. If the distance from the mass point 1' to the mass point 2' is given as l, and a thrust F is applied to the mass point 1' for a time $\Delta t$ in a direction perpendicular to the direction of elongation, a velocity increase at the center of gravity of the coupled system is represented by $$\Delta V = r1 \, F \, \Delta t \, / \, m1 \quad (1)$$

and a rotational velocity around the center of gravity is represented by $$\phi = F \, \Delta t \, / \, lm1 \quad (2)$$

where $r1 = m1/(m1+m2)$ and $r2 = m2/(m1+m2)$.

Figure 6:
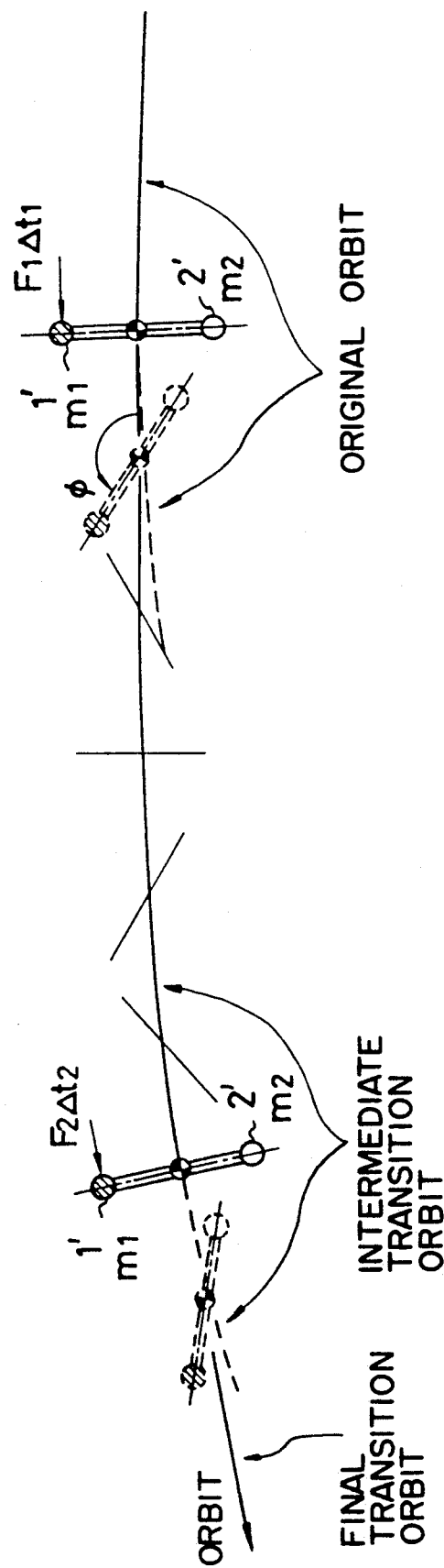
FIG. 6 is a view showing the embodiment in which a thrust is intermittently applied to the orbit changing apparatus, and showing the attitude of the coupled system at this time.

If the longitudinal direction of the coupled system is perpendicular to an orbital velocity vector, the original orbital velocity $V_c$ becomes parallel to the velocity increase $\Delta V$ at the center of gravity. A case wherein the velocity increase $\Delta V$ acts in a direction to increase the orbital velocity will be described below. When the time $\Delta t$ during which the thrust F is applied is increased, the angle $\phi$ is deviated from a right angle, resulting in loss of a velocity increase. This loss can be effectively reduced by intermittently generating the thrust F in synchronism with a predetermined rotational state of the coupled system in the transition orbit, as shown in FIGS. 5 and 6. More specifically, in FIG. 5, a thrust F1 is generated for a time $\Delta t_1$ at a first jet point A which is determined when the original orbit has $\phi = \pi$, and a thrust F2 is generated for a time $\Delta t_2$ at a second jet point B in the transition orbit.

FIG. 6 shows a case wherein the thrust F1 is applied to the orbit changing apparatus 1 in the original orbit for the time $\Delta t_1$, and the thrust F2 is applied to the apparatus 1 for the time $\Delta t_2$ when the coupled system in an intermediate transition orbit has the same attitude as that in the original orbit, thereby moving the coupled system to a final transition orbit.

Consequently, the center of gravity of the coupled system is moved to the transition orbit O2 as shown in FIG. 1, and the coupled system is rotated about the center of gravity at the predetermined rotational velocity $\phi$ as shown in FIG. 4. When the rotational angle $\phi = 3\pi/2$, the velocity of the mass point 1' shown in FIG. 4 differs from that of the center of gravity by $$\Delta V_1' = \frac{\phi}{l} r2 \, l = -\frac{r2}{r1} \Delta V \quad (3)$$

and the velocity of the mass point 2' differs from that of the center of gravity by $$\Delta V_2' = \phi r1 = \Delta V \quad (4)$$

As shown in FIG. 2, therefore, the two mass points 1' and 2' of the coupled system equivalently gain the velocity increases $\Delta V_1'$ and $\Delta V_2'$, respectively, at the apogee P2 in the transition orbit. If the mass point 2' gains, at the apogee P2, the same velocity increase as that gained at the perigee P1 in the original orbit, the mass point 2' is separated from the mass point 1' and is moved to a circular orbit as a target satellite orbit having a new orbital radius $R\{1 + 4(\Delta V/V_0)\}$. Such separation of the target satellite from the orbit changing apparatus and the subsequent orbit will be described below with reference to FIGS. 7A and 7B.

FIGS. 7A and 7A(1) shows a case wherein the mass m2 of the target satellite 2 is separated from the mass m1 of the orbit changing apparatus 1 at an apogee P2 in a transition orbit O2 shifted from an original orbit O1, and the mass m2 is placed in a target satellite orbit O3 while the apparatus 1 is placed in an elliptic orbit O4 crossing the original orbit O1. FIG. 7A(1) shows an enlarged view in the vicinity of apogee P2 is FIG. 7A. As described above, only the velocity increase $\Delta V_1$ is required to move the target satellite 2 to the target orbit O3. This increase corresponds to ½ the velocity increase required for a corresponding orbit change without a rotational motion in the conventional method. In order to return the orbit changing apparatus 1 to the original orbit, the velocity of the apparatus 1 is increased by $(r2/r1)\Delta V$ at the apogee P2 after the separation so as to return it to the transition orbit O2, and the velocity is then decreased by $\Delta V$ at the perigee P1.

FIGS. 7B and 7B(1) show a case wherein the mass m2 is separated from the mass m1 at the perigee P1. FIGS. 7B(1) shows an enlarged view in the vicinity of perigee P1 in FIG. 7B. In this case, the mass m2 of the target satellite 2 gains a velocity increase $2\Delta V$ with respect to the original orbital velocity $V_c$, and the mass point m1 of the orbit changing apparatus 1 equivalently gains a velocity increase $(1 - r2/r1)\Delta V$. As a result, the mass point m2 gains an apogee altitude increase twice the altitude of the transition orbit O2, and the mass m1 stays in an orbit O4 very close to the original orbit O1. In an extreme case, when $r1 = r2 = 0.5$, the mass m1 stays in the original orbit. In this case, since the orbit changing apparatus 1 is returned to an orbit near the original orbit O1, it may collide with another satellite in the original orbit but is convenient for reuse. FIGS. 8A, 8B, 9A, and 9B respectively show graphs obtained by computer simulation results of the above-described orbit changes, in which satellites and masses in a stationary orbit are exemplified. In this case, an orbit changing apparatus and a target satellite have the same mass, and the velocity increase of the center of gravity of a coupled system constituted by the apparatus and the satellite is set to be 5 m/sec. In each drawing, a coordinate system is fixed to the center of gravity of the satellite when no orbit changing operation is performed. In each coordinate system, the ordinate represents the direction of an orbital radius; and the abscissa, the direction of orbital velocity. FIGS. 8B and 9B respectively are enlarged views of portions near the origins of the coordinate systems in FIGS. 8A and 9A, and clearly show states immediately after the orbit changing apparatus generates a thrust. Note that a coupling member length is larger than an actual coupling member length so as to clearly show the behavior of the coupled system. Black and white dots of the coupled system respectively represent the orbit changing apparatus and the target satellite. FIGS. 8A and 8B show a case wherein separation of the coupled system is performed at the apogee in the transition orbit. In this case, the coupled system gains a velocity increase and is moved to the transition orbit having an apogee at a distance of about 280 km from GEO. During this movement, the coupled system is rotated within an orbital plane. The coupled system reaches the apogee 12 hours after the coupled system is moved from the original orbit to the transition orbit. The target satellite is separated from the orbit changing apparatus at a timing when the direction of elongation of the coupled system becomes perpendicular to the orbital velocity vector near the apogee. The target satellite is moved from the stationary orbit to a substantially circular orbit having an orbital radius of $280 \pm 30$ km. On the other hand, the orbit changing apparatus is placed in an elliptic orbit having an apogee at a distance of $+290$ km from GEO, and a perigee at a distance of $-320$ km from GEO.

FIGS. 9A and 9B show a state in which the target satellite is separated from the apparatus when the coupled system is rotated half, a short time after the orbit changing apparatus generates a thrust. The target satellite is placed in an orbit having an apogee at a distance of 560 km from GEO, whereas the orbit changing apparatus stays in a substantially stationary orbit.

When the above-described orbit changing method of the present invention is compared with the conventional method, it is found that the centers of gravity of the coupled systems gain the same velocity increase $\Delta V$ after the orbit changing apparatus respectively generate thrusts, but the coupled system of the present invention additionally gains a rotational velocity around the center of gravity. Therefore, the target satellite in the present invention always gains a velocity increase twice that of the target satellite in the conventional method. This means that energy, i.e., fuel required to move the target satellite in the present invention is $\frac{1}{2}$ that in the conventional method. In this case, the velocity increase is not influenced by the above values r1 and r2 and the coupling member length l, and does not depend on whether an orbit changing operation is performed at an apogee or a perigee. This reduction in energy is realized because the orbit changing apparatus loses energy, thus reducing fuel required for recovery of the orbit changing apparatus.

Figure 10:
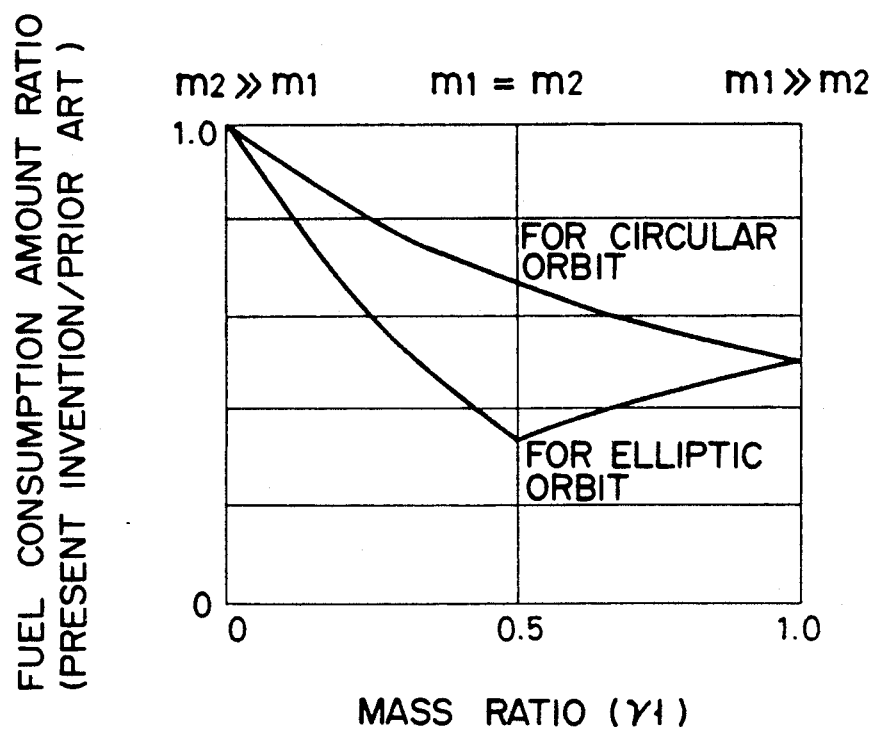
FIG. 10 is a graph showing the ratio of a fuel consumption amount required for an orbit change in the present invention to that in the conventional method at a predetermined mass ratio.

FIG. 10 is a graph obtained by plotting the ratio of the overall fuel consumption amount, which is required to return the orbit changing apparatus to the original orbit in the conventional method, to that in the present invention at a mass ratio r1. As is apparent from FIG. 10, when the mass ratio $r1=(m1/(m1+m2))$, and the mass m1 of the orbit changing apparatus is larger than the mass m2 of the target satellite, the fuel consumption amount in the present invention is about $\frac{1}{2}$ that in the conventional method. In addition, when m1=m2, the fuel consumption amount required when a jet is generated to perform an orbit change in the elliptic orbit in the present invention is about $\frac{1}{3}$ that in the conventional method.

A detailed arrangement of the orbit changing apparatus of the present invention will be described below.

Figure 11:
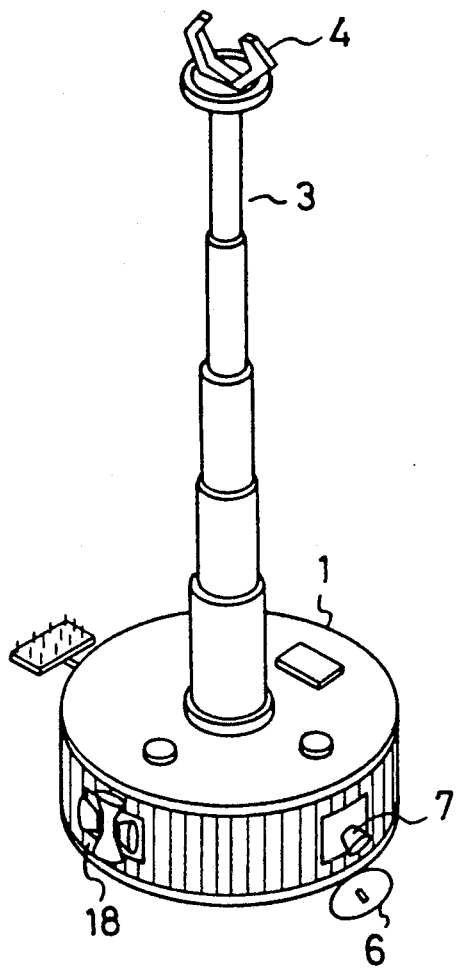
FIG. 11 is a perspective view showing an outer appearance of a structure of a coupling member 3 which can expand and contract according to a modification of the present invention.

FIG. 11 shows an embodiment of the expansible coupling member 3 mounted on the orbit changing apparatus 1, as previously described with reference to FIG. 3. The coupling member 3 is designed to coaxially expand and contract stepwise. The same reference numerals in FIG. 11 denote the same parts as in FIG. 3, and a description thereof will be omitted.

The coupling members 3 shown in FIGS. 3 and 11 are designed to connect the mass points of the orbit changing apparatus 1 and the target satellite through a straight member having a binding force. However, the present invention is not limited to this. For example, as shown in FIG. 12, they may be connected by a flexible cable. Referring to FIG. 12, a metal catching member 4 is coupled to a cable 8, and is received by a reception member 9 on a main body 1. The cable 8 can be taken up by a drum 11 through a guide 10 in the main body 1. The drum 11 is driven by a drum driver 12. The taken-up cable 8 is connected to a metal catching member driving controller 13. The controller 13 is connected to a central processing unit (to be referred to as a CPU hereinafter) 14 and is controlled thereby.

Such a flexible cable can be used for the following reason. Only an axial force acts on a coupling member of the above-described coupled system. In addition, this axial force is mostly constituted by a centrifugal force by the rotation motion $\phi$. Therefore, the cable itself is seldom slackened.

A radio receiver may be arranged near the metal catching member 4 so as to receive a command signal for driving the member 4 from the earth or the main body 1. If the coupling member is constituted by a boom, a signal line is arranged along the boom and is connected to the metal catching member 4. If the coupling member is constituted by the cable 8, the cable 8 itself may be used as a signal line. A separating operation of the coupled system is performed by releasing catching of the metal catching member 4 which is catching the target satellite 1. However, the separating operation may be performed by causing the orbit changing apparatus to cut off the proximal end of the cable 8, regarding the cable 8 and the metal catching member 4 as expendable members.

With regard to mechanisms and control techniques for taking up and straightening a cable, sufficient examination and development have been made so far in, e.g., the experiments on the tethered satellites using the space shuttles. Therefore, no technical problems are posed in the execution of the orbit changing apparatus of the present invention.

As described above, the coupling member 3 requires no rigidity except for rigidity in the axial direction in which the coupling member 3 expands and contracts. For this reason, a catching and coupling means requires no rigidity restricting rotation.

In order to limit a force acting on the coupling member 3 and the catching means to a given value or less, the coupling member 3 requires a certain length. Assume, for example, that a target satellite is to be moved to an orbit higher than an original orbit by 200 km. In this case, if the length of the coupling member 3 is 5 to 10 m, an acceleration generated by a centrifugal force is 1 G or less, and no practical problems are posed. As a catching means, simple members, such as electromagnetic driving grippers, which can simply endure an axial force from the coupling member 3 may be used.

Constituent elements housed in the main body of the orbit changing apparatus of the present invention, an operation of a propulsion unit of the elements, and an operation of separating a target satellite upon catching will be described below with reference to FIGS. 13, 14, and 15.

Figure 13:
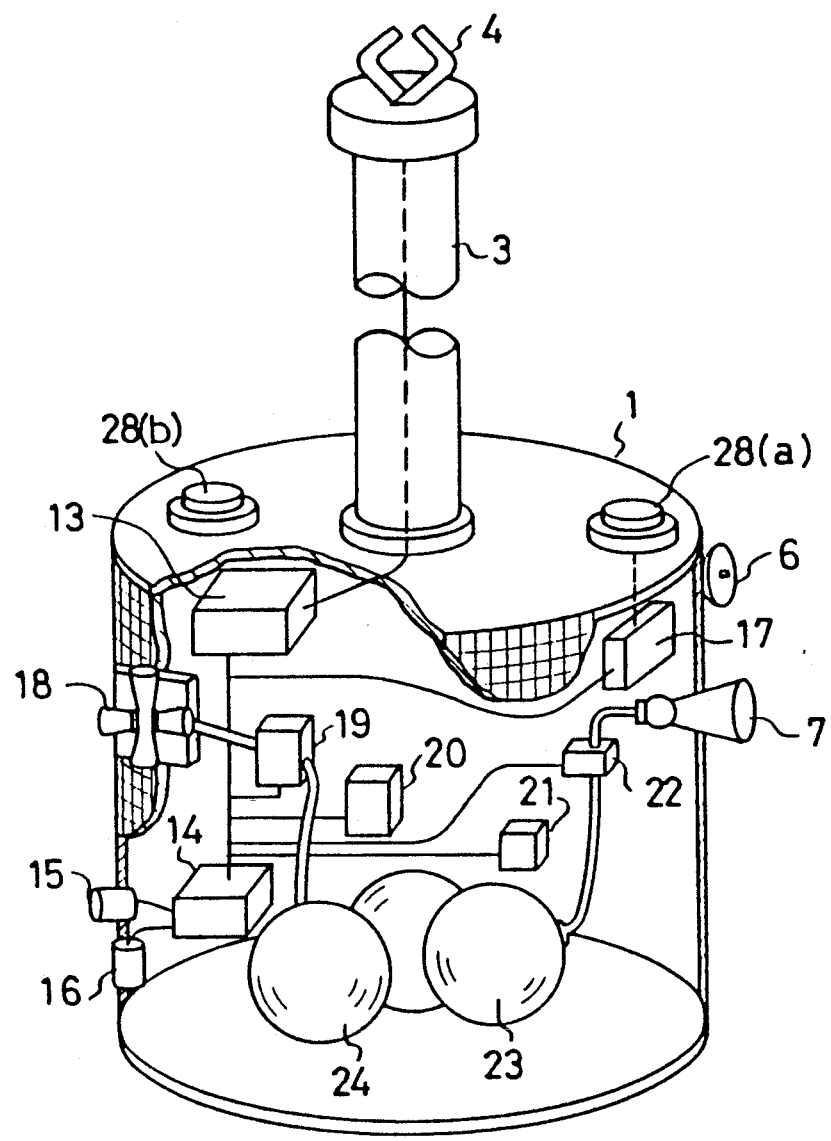
FIG. 13 is a view showing an embodiment of constituent elements housed in a main body of the orbit changing apparatus of the present invention.

As shown in FIG. 13, one end of an elongated coupling member 3 is mounted on a main body 1. A metal catching member 4 is mounted on the other end of the coupling member 3. An opening/closing operation of the metal catching member 4 is performed by a metal catching member driving controller 13. The controller 13 is connected to a telemetry command transmitting/receiving unit 17 through a CPU 14. An operation of the metal catching member 4 is performed under remote control from the earth by an operator watching images on TV cameras 28(a) and 28(b).

A sensor section constituted by a solar sensor 15 and an earth sensor 16, and a CPU 14 connected to the sensor section are housed in the main body 1. The sensor section serves as a means for detecting the orbital velocity vector and the attitude of the main body 1. After a target satellite 2 is caught, the orbit of the coupled system is determined mainly by observation from the earth. In addition, data associated with a celestial body are obtained from the solar sensor 15 and the earth sensor 16, and an angle between an orbital velocity vector at each time and a vector obtained in consideration of the celestial body is calculated. More accurate attitude data is obtained moment by moment from a gyro 21. The telemetry command transmitting/receiving unit 17 receives and decodes these angular data from the earth, and obtains an output from the CPU 14, thus controlling a propulsion unit driver 19 to cause an orbit control propulsion unit 18 to generate a thrust. As a result, an initial attitude can be ensured, in which the direction of elongation of the coupled system is perpendicular to the orbital velocity vector, and the direction of the propulsion unit 7 coincides with a velocity increase vector $\Delta V$ to be obtained.

The attitude of the main body 1 is controlled by an attitude changing means constituted by a wheel 20.

The propulsion unit 7 is driven by a valve driver 22. The unit 7 is connected to a fuel tank 23 through a fuel feed line and is also connected to the CPU 14 through an electric wire. The orbit control propulsion unit 18 is also connected to a fuel tank 24 through a feed line.

An operation of the propulsion unit 7 will be described below with reference to the block diagram in FIG. 14.

The propulsion unit 7 generates a thrust when fuel is supplied from the fuel tank 23 by opening a valve 25. Opening/closing control of the valve 25 is performed by an output from the valve driver 22 as a propulsion unit driving controller. The valve driver 22 is driven on the basis of orbit data which is analyzed by an orbital position analyzer 26, received by a receiver 17 through a ground station 27, and is input to the CPU 14, and an output from the CPU 14 upon reception of data as a detection output from the solar and earth sensors 15 and 16 which detect the orbit and attitude of the main body 1 and an attitude output from the gyro 21. Each sensor output value at the time of start and stop of the operation of the propulsion unit 7 is designated from the earth. By driving/controlling the valve driver 22 in this manner, the propulsion unit 7 intermittently generates a thrust.

A separating operation will be described with reference to the block diagram of FIG. 15 which shows a separating operation of a target satellite. The metal catching driving controller 13 is controlled by an output from the CPU 14. Opening/closing control of the metal catching member 4 connected to the controller 13 is performed in accordance with an output from the controller 13. Other operations are the same as those described with reference to FIG. 14. A timing at which a target satellite is separated is determined by a command from the earth. When attitude data from the solar and earth sensors 15 and 16 and the gyro 21 coincide with a command signal, the CPU 14 outputs a command signal and drives the catching metal member 13, thus opening the member 4 and separating the target satellite.

As described above, according to the method of changing the orbit of an artificial satellite and the orbit changing apparatus of the present invention, a target satellite is moved from a circular orbit to another orbit for the sake of a simple description. It is, however, apparent that the present invention can be applied to an arbitrary orbit change such as a change from an elliptic orbit to a circular orbit or an elliptic orbit to an elliptic orbit. The present invention may be most effectively applied to a case wherein a large number of inoperative satellites floating in stationary orbits are respectively discarded into higher orbits, and may also be applied to a ferry between a space station and other non-manned facilities, or between an orbit reciprocating craft and a space station. In addition, the present invention may be most effectively applied to various cases, e.g., cases wherein a low-orbit satellite is moved to an orbit to return to the earth, and an orbit change is to be performed from an earth orbit to an orbit to escape from the gravitational pull of the earth. After these missions are achieved, each orbit changing apparatus itself stays in an orbit near an original orbit. Therefore, a large amount of propellant need not be used, or no critical maneuver is required a short time after a mission. In addition, the orbit changing apparatus of the present invention can continuously achieve a plurality of missions.

As has been described above, according to the present invention, the orbit changing apparatus can change the orbit of an artificial satellite by using a simple, lightweight catching means in a small energy consumption amount without performing a complicated docking operation. Therefore, the orbit changing apparatus can be economically reused. In addition, by executing the present invention, a given stationary satellite can be economically removed from its orbit for a new satellite.

I claim:

1. A method of changing an orbit of an artificial satellite, comprising the steps of:

causing an orbit changing apparatus to approach a target satellite in an orbit around the earth, causing a catching member mounted on said orbit changing apparatus and arranged at a distal end of an elongated coupling member to catch the target satellite, and forming a coupled system by coupling said orbit changing apparatus to the target satellite through said elongated coupling member;

simultaneously placing the center of gravity of said coupled system in a transition orbit and generating a rotational motion around the center of gravity by causing a propulsion unit mounted on said orbit changing apparatus to generate a thrust at least once in a direction perpendicular to a direction of elongation of said coupling member; and releasing said coupled system at a timing when the direction of elongation of said coupling member of said coupled system becomes perpendicular to an orbital velocity vector in the transition orbit thereby separating said target satellite from said orbit changing apparatus, placing the target satellite in a final target orbit, and placing said orbit changing apparatus in an orbit different from the target orbit.

2. A method of changing an orbit of an artificial satellite according to claim 1, wherein the step of forming said coupled system comprises catching the target satellite while said elongated coupling member is caused to contract, and subsequently causing said elongated coupling member to expand so as to form said coupled system.

3. A method of changing an orbit of an artificial satellite according to claim 1, wherein the step of simultaneously generating the orbital velocity vector at the center of gravity of said coupled system upon generation of the thrust and the rotational force around the center of gravity comprises generating a thrust a plurality of times at timings when the direction of elongation of said coupled system becomes perpendicular to the orbital velocity vector upon rotation of said coupled system in the transition orbit.

4. A method of changing an orbit of an artificial satellite according to claim 1, wherein the step of separating the target satellite and placing the target satellite and said orbit changing apparatus in different orbits comprises releasing said coupled system at an apogee of the transition orbit.

5. A method of changing an orbit of an artificial satellite according to claim 1, wherein the step of separating the target satellite and placing the target satellite and said orbit changing apparatus in different orbits comprises releasing said coupled system at a perigee of the transition orbit.

6. An apparatus for changing an orbit of an artificial satellite, comprising:

an orbit changing apparatus main body;

an elongated coupling member having one end mounted on said orbit changing apparatus main body;

a catching member, arranged at a distal end of said coupling member, for catching a target satellite;

a control section, coupled to said catching member, for controlling an operation of said catching member so as to catch the target satellite;

means, combined with orbit data transmitted from the earth, for detecting an orbital velocity vector and an attitude of said orbit changing apparatus main body;

means, arranged in said orbit changing apparatus main body, for changing/controlling an orbit of said main body;

means, arranged in said orbit changing apparatus main body, for changing/controlling the attitude of said main body in an orbit;

propulsion means, arranged in said orbit changing apparatus main body, for generating a thrust in a direction perpendicular to a direction of elongation of said coupling member;

control means for driving said propulsion means in synchronism with a timing when said axis of the thrust becomes parallel to an orbital velocity vector of the center of gravity of a coupled system constituted by said orbit changing apparatus and the target satellite; and catching member driving control means, arranged in said orbit changing apparatus main body, for releasing said coupled system at a timing when the direction of elongation of said coupled system becomes perpendicular to the orbital velocity vector, placing the target satellite in a final target orbit, and placing said separated orbit changing apparatus in an orbit different from the final target orbit.

7. An apparatus for changing an orbit of an artificial satellite according to claim 6, wherein said coupling member is expansible, catches the target satellite while said coupling member contracts, and is subsequently caused to expand to form said coupled system.

8. An apparatus for changing an orbit of an artificial satellite according to claim 7, wherein said coupling member is expansible stepwise.

9. An apparatus for changing an orbit of an artificial satellite according to claim 7, wherein said coupling member comprises an extensible cable upon winding and rewiding operations.

* * * * *